US012640304B2

(12) United States Patent
Kawaguchi et al.

(10) Patent No.: US 12,640,304 B2
(45) Date of Patent: May 26, 2026

(54) COIL COMPONENT

(71) Applicant: TDK Corporation, Tokyo (JP)

(72) Inventors: Yuuichi Kawaguchi, Tokyo (JP); Naoaki Fujii, Tokyo (JP); Tomonaga Nishikawa, Tokyo (JP)

(73) Assignee: TDK Corporation, Tokyo (JP)

( * ) Notice: Subject to any disclaimer, the term of this patent is extended or adjusted under 35 U.S.C. 154(b) by 714 days.

(21) Appl. No.: 18/044,872

(22) PCT Filed: Sep. 7, 2021

(86) PCT No.: PCT/JP2021/032850

§ 371 (c)(1),
(2) Date: Mar. 10, 2023

(87) PCT Pub. No.: WO2022/070804

PCT Pub. Date: Apr. 7, 2022

(65) Prior Publication Data

US 2023/0368969 A1 Nov. 16, 2023

(30) Foreign Application Priority Data

Sep. 29, 2020 (JP) ................................ 2020-163223

(51) Int. Cl.
*H01F 27/32* (2006.01)
*H01F 27/28* (2006.01)
*H01F 27/29* (2006.01)

(52) U.S. Cl.
CPC ....... *H01F 27/323* (2013.01); *H01F 27/2804* (2013.01); *H01F 27/292* (2013.01); *H01F 2027/2809* (2013.01)

(58) Field of Classification Search
CPC ............... H01F 27/323; H01F 27/2804; H01F 27/292; H01F 2027/2809
See application file for complete search history.

(56) References Cited

U.S. PATENT DOCUMENTS

2013/0187744 A1* 7/2013 Seko .................. H01F 17/0013 336/200
2014/0078643 A1* 3/2014 Odahara .............. H01F 27/292 156/89.12
(Continued)

FOREIGN PATENT DOCUMENTS

JP 10-308322 A 11/1998
JP H10308322 A * 11/1998
JP 2013-153009 A 8/2013

OTHER PUBLICATIONS

Japan Patent Office Decision to Grant a Patent 2024 (Year: 2024).*
(Continued)

*Primary Examiner* — Malcolm Barnes
(74) *Attorney, Agent, or Firm* — Rimon P.C.

(57) ABSTRACT

To prevent a short-circuit failure by controlling the flow of a solder in a surface-mount type coil component. A coil component includes a coil part in which conductor layers and interlayer insulating layers are alternately stacked. The conductor layers respectively have coil conductor patterns embedded in the coil part and electrode patterns exposed from the coil part. The interlayer insulating layers each protrude from the plurality of electrode patterns at a part between the electrode patterns, and the flow of a solder in the stacking direction is suppressed by the protruding parts. This makes it possible to prevent a short-circuit failure due to the flow of a solder in the stacking direction.

5 Claims, 6 Drawing Sheets

(56) References Cited

U.S. PATENT DOCUMENTS

| | | | | |
|---|---|---|---|---|
| 2018/0323003 | A1* | 11/2018 | Fujii | H01F 27/2804 |
| 2020/0075220 | A1* | 3/2020 | Wada | H01F 27/2804 |

OTHER PUBLICATIONS

International Search Report issued in corresponding International Patent Application No. PCT/JP2021/032850, dated Nov. 16, 2021, with English translation.

* cited by examiner

COIL COMPONENT

CROSS REFERENCE TO RELATED APPLICATIONS

This application is the U.S. National Phase under 35 U.S.C. § 371 of International Application No. PCT/JP2021/032850, filed on Sep. 7, 2021, which claims the benefit of Japanese Application No. 2020-163223, filed on Sep. 29, 2020, the entire contents of each are hereby incorporated by reference.

TECHNICAL FIELD

The present invention relates to a coil component and, more particularly, to a surface-mount type coil component having a structure in which a plurality of conductor layers each including a coil conductor pattern and an electrode pattern and a plurality of interlayer insulating layers are alternately stacked.

BACKGROUND ART

Patent Document 1 describes a surface-mount type coil component having a structure in which a plurality of conductor layers and a plurality of interlayer insulating layers are alternately stacked. In the coil component described in Patent Document 1, a plating applied to the externally exposed surface of an electrode pattern is used as an external terminal.

CITATION LIST

Patent Document

[Patent Document 1] JP 2013-153009A

SUMMARY OF THE INVENTION

Problem to be Solved by the Invention

However, high density mounting of the coil component described in Patent Document 1 may cause a short-circuit failure due to the flow of a solder in an unintended direction.

It is therefore an object of the present invention to prevent a short-circuit failure by controlling the flow of a solder in a surface-mount type coil component having a structure in which a plurality of conductor layers and a plurality of interlayer insulating layers are alternately stacked.

Means for Solving the Problem

A coil component according to the present invention includes a coil part in which a plurality of conductor layers and a plurality of interlayer insulating layers are alternately stacked. The plurality of conductor layers each have a coil conductor pattern embedded in the coil part and an electrode pattern exposed from the coil part. The plurality of electrode patterns are connected to one another through a plurality of via conductors penetrating the plurality of interlayer insulating layers. One or more interlayer insulating layers protrude from the surfaces of the plurality of electrode patterns at a part between the plurality of electrode patterns.

According to the present invention, the interlayer insulating layer protrudes from the surface of the electrode pattern, so that the flow of a solder in the stacking direction can be suppressed by the protruding part of the interlayer insulating layer. This makes it possible to prevent a short-circuit failure due to the flow of a solder in the stacking direction.

The coil component according to the present invention may further include first and second magnetic layers sandwiching the coil part in the stacking direction. This makes it possible to obtain larger inductance. In this case, the surface of each of the plurality of electrode patterns may be recessed from the surfaces of the first and second magnetic layers. This makes a solder less likely to flow to the surfaces of the first and second magnetic layers.

In the present invention, the surface of each of the plurality of electrode patterns may be covered with an external terminal, and the protruding amount of each of the plurality of interlayer insulating layers from the surface of the eternal terminal may be set to 1 μm to 5 μm. This makes it possible to sufficiently control the flow of a solder while suppressing an increase in manufacturing cost.

In the present invention, the surfaces of the plurality of electrode patterns and protruding parts of the plurality of interlayer insulating layers may be covered with a conductive paste. This makes it possible to enlarge contact area with a solder at the time of mounting.

Advantageous Effects of the Invention

As described above, according to the present invention, it is possible to prevent a short-circuit failure due to unintended flow of a solder in a surface-mount type coil component having a structure in which a plurality of conductor layers and a plurality of interlayer insulating layers are alternately stacked.

MODE FOR CARRYING OUT THE INVENTION

Hereinafter, preferred embodiments of the present invention will be described in detail with reference to the accompanying drawings.

Figure 1:
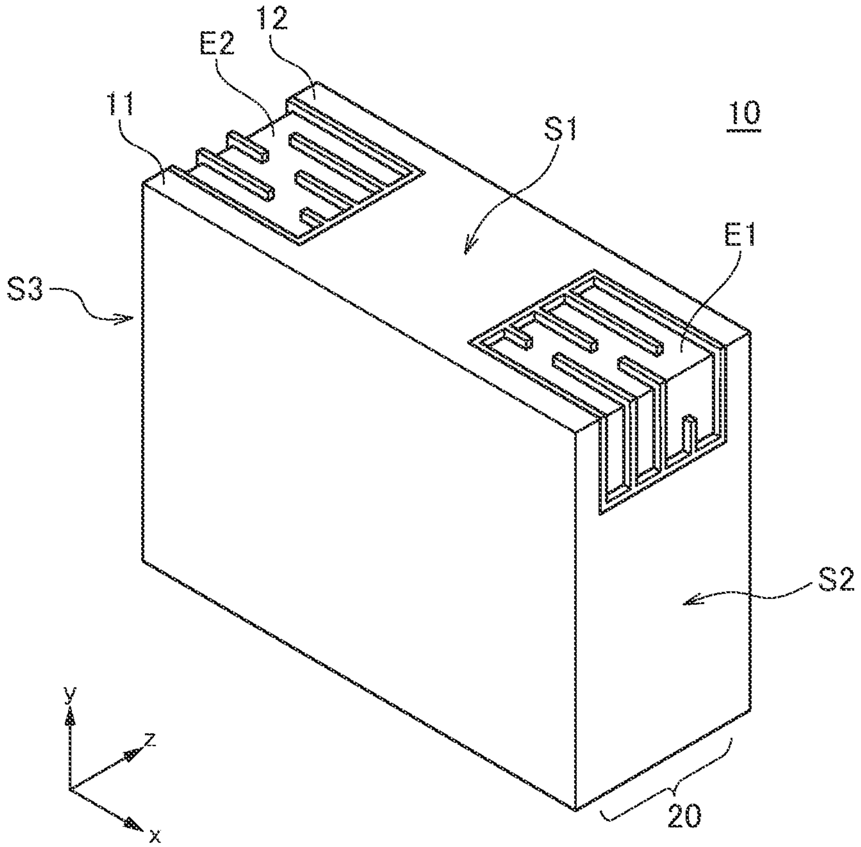
FIG. 1 is a perspective view illustrating the outer appearance of a coil component 10 according to a preferred embodiment of the present invention.

FIG. 1 is a perspective view illustrating the outer appearance of a coil component 10 according to a preferred embodiment of the present invention.

The coil component 10 according to the present embodiment is a surface-mount type chip component and includes, as illustrated in FIG. 1, first and second magnetic layers 11, 12 and a coil part 20 sandwiched between the first and second magnetic layers 11 and 12. Although the configuration of the coil part 20 will be described later, in the present embodiment, four conductor layers each having a coil conductor pattern are stacked to form one coil. One end of the coil is connected to a first external terminal E1, and the other end thereof is connected to a second external terminal E2.

The magnetic layers 11 and 12 are each a composite member made of resin containing magnetic powder such as ferrite powder or magnetic metal powder and constitute a magnetic path for magnetic flux generated by making current flow in the coil. When magnetic metal powder is used as the magnetic powder, a permalloy-based material is preferably used. Further, the resin is preferably epoxy resin in the form of liquid or powder. However, it is not essential to constitute the magnetic layers 11 and 12 using a composite member in the present invention and, for example, a substrate made of a magnetic material such as sintered ferrite may be used as the magnetic layer 11.

Unlike a common multilayer coil component, the coil component 10 according to the present embodiment is vertically mounted such that the z-direction (stacking direction) is parallel to a circuit board. Specifically, a surface S1 constituting the xz plane is used as a mounting surface. The surface S1 has the first and second external terminals E1 and E2. The first external terminal E1 is connected with one end of the coil formed in the coil part 20, and the second external terminal E2 is connected with the other end of the coil formed in the coil part 20.

As illustrated in FIG. 1, the first external terminal E1 is continuously formed from the surface S1 to a surface S2 constituting the yz plane, and the second external terminal E2 is continuously formed from the surface S1 to a surface S3 constituting the yz plane. Although details will be described later, the external terminals E1 and E2 are each constituted by a laminated film of nickel (Ni) and tin (Sn) formed on the exposed surface of each of electrode patterns included in the coil part 20. The exposed surface of each of the electrode patterns is not a so-called solid pattern, but an interlayer insulating layer protrudes from between electrode patterns adjacent in the z-direction. That is, the external terminals E1 and E2 are formed avoiding the protruding parts of the interlayer insulating layers.

Figure 2:
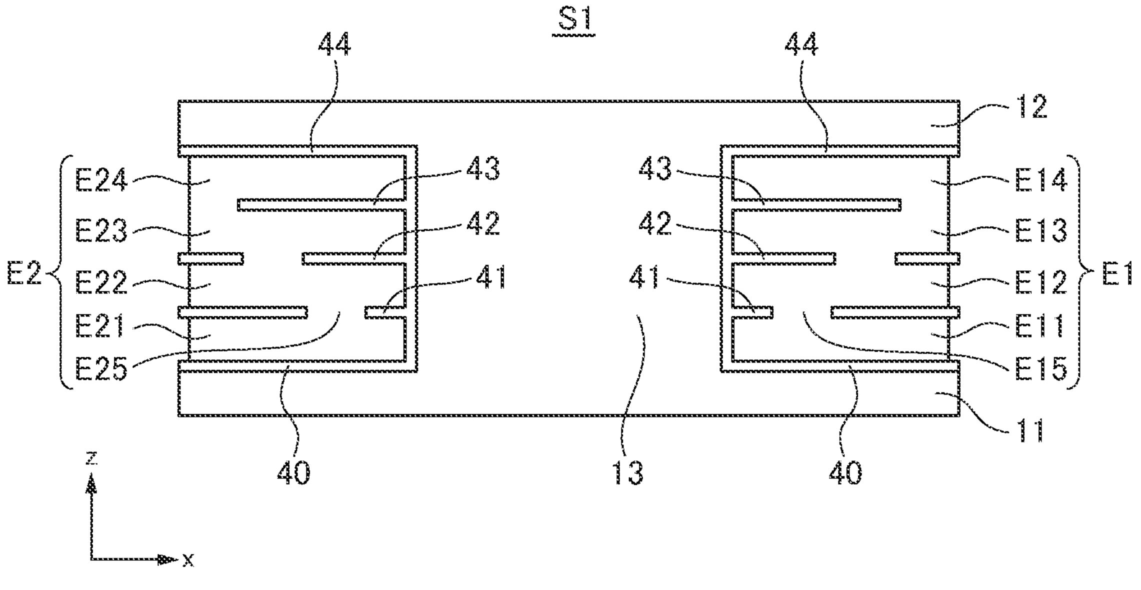
FIG. 2 is a plan view illustrating a structure of the surface S1 of the coil component 10.
Figure 3:
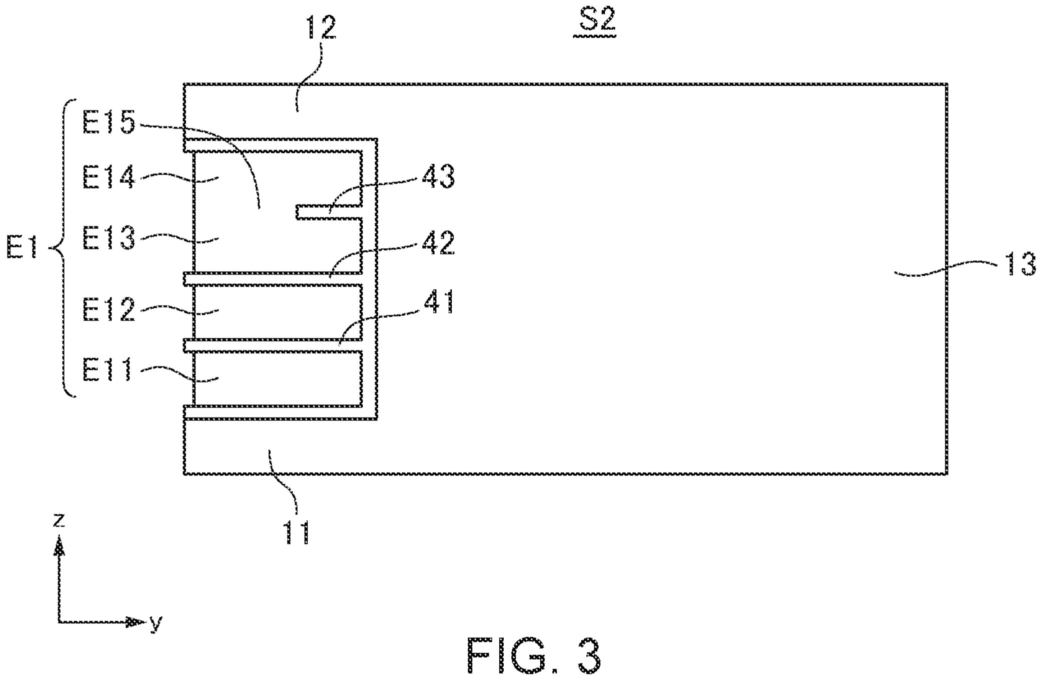
FIG. 3 is a plan view illustrating a structure of the surface S2 of the coil component 10.
Figure 4:
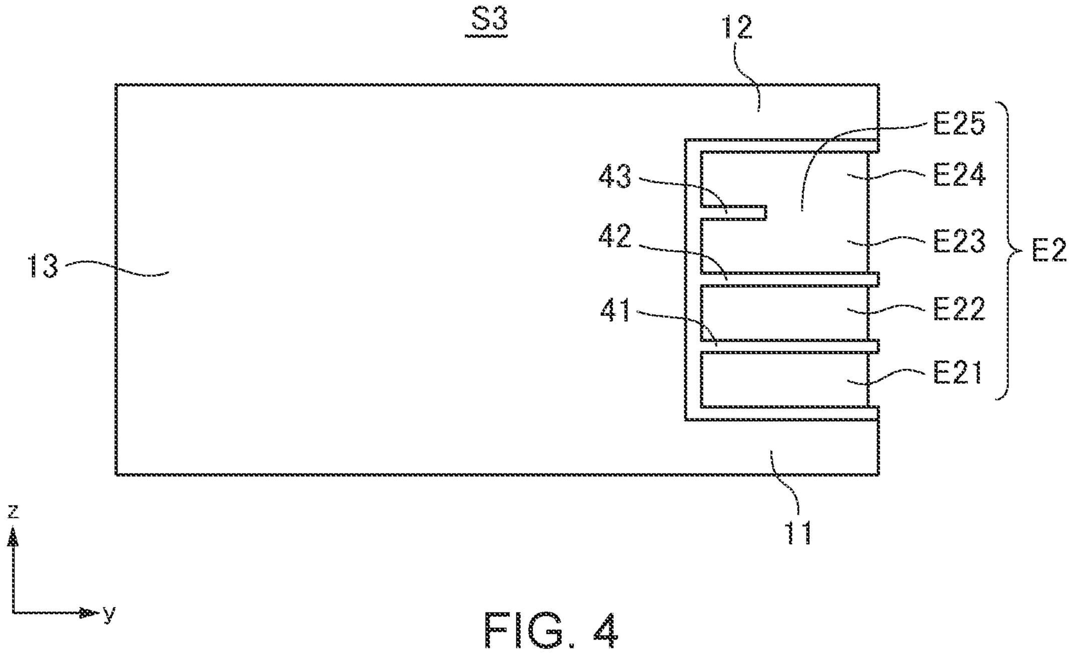
FIG. 4 is a plan view illustrating a structure of the surface S3 of the coil component 10.

FIGS. 2 to 4 are plan views illustrating respectively structures of the surfaces S1 to S3 of the coil component 10.

As illustrated in FIGS. 2 and 3, the first external terminal E1 has first to fourth parts E11 to E14 each formed on the surfaces S1 and S2 and extending in the x- or y-direction and a fifth part E15 connecting the first to fourth parts E11 to E14. Interlayer insulating layers 41 to 43 protrude at a part between the first to fourth parts E11 to E14 except for an area where the fifth part E15 exists. Further, as illustrated in FIGS. 2 and 4, the second external terminal E2 has first to fourth parts E21 to E24 each formed on the surfaces S1 and S3 and extending in the x- or y-direction and a fifth part E25 connecting the first to fourth parts E21 to E24. The interlayer insulating layers 41 to 43 protrude at a part between the first to fourth parts E21 to E24 except for an area where the fifth part E25 exists.

The protrusion of the interlayer insulating layers 41 to 43 is generated by a recess of each of the external terminals E1 and E2. That is, the surface of the external terminal E1 (E2) is recessed from the surfaces of the magnetic layers 11 and 12, while the protruding parts of the interlayer insulating layers 41 to 43 are substantially flush with the surfaces of the magnetic layers 11 and 12. As a result, the interlayer insulating layers 41 to 43 each protrude from the surface of the external terminal E1 (E2) by a level difference between the surface of the external terminal E1 (E2) and the surfaces of the magnetic layers 11 and 12. The protruding amount of each of the interlayer insulating layers 41 to 43 from the surface of the external terminal E1 (E2) is preferably set to 1 μm to 5 μm. When the protruding amount is less than 1 μm, effects to be described later cannot be obtained sufficiently. On the other hand, in order to make the interlayer insulating layers 41 to 43 protrude by more than 5 μm, it is necessary to perform etching to be described later for a long period of time, which increases manufacturing cost and may deteriorate reliability due to etching damage.

Further, a part of the surface of the coil part 20 sandwiched between the magnetic layers 11 and 12 that is covered with the external terminals E1 and E2 and that does not have the interlayer insulating layers 40 to 44 is constituted by a magnetic member 13. The magnetic member 13 plays a role of magnetically connecting the magnetic layers 11 and 12.

Figure 5:
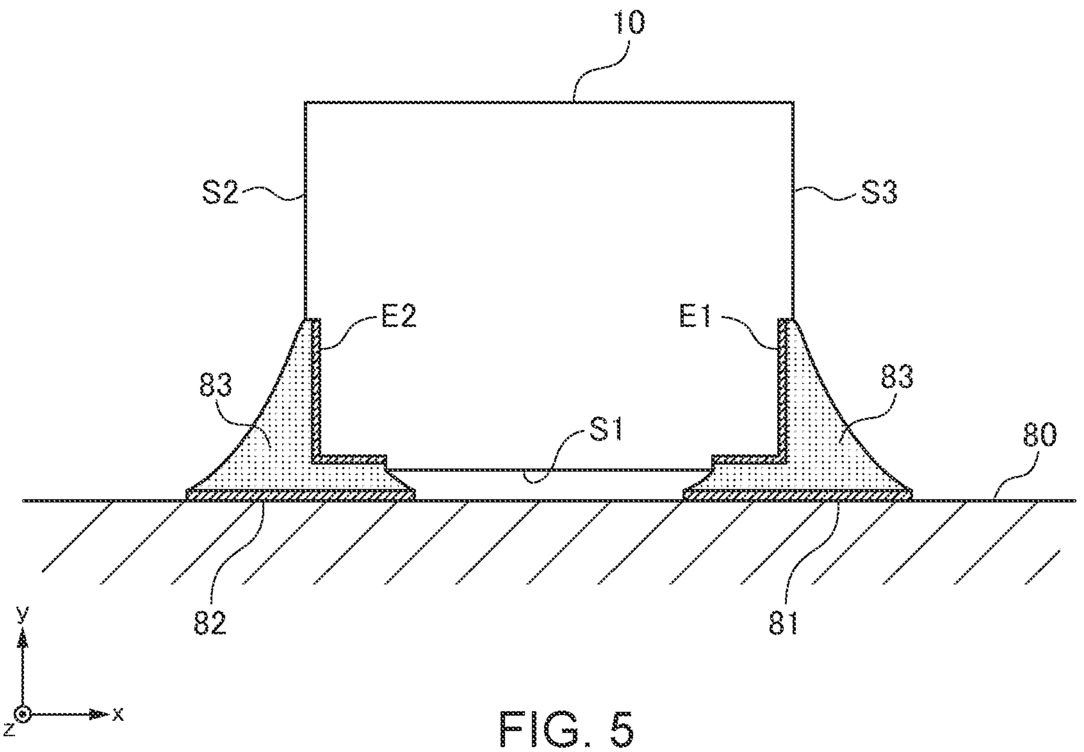
FIG. 5 is a side view illustrating a state where the coil component 10 is mounted on a circuit board 80.

FIG. 5 is a side view illustrating a state where the coil component 10 according to the present embodiment is mounted on a circuit board 80, which is viewed in the stacking direction.

As illustrated in FIG. 5, the coil component 10 according to the present embodiment is vertically mounted on the circuit board 80. Specifically, the coil component 10 is mounted such that the surface S1 of the coil part 20 faces the mounting surface of the circuit board 80, that is, the z-direction (stacking direction) surface of the coil component 10 is parallel to the mounting surface of the circuit board 80.

Land patterns 81 and 82 are provided on the circuit board 80 and are connected respectively with the external terminals E1 and E2 of the coil component 10. Electrical and mechanical connection between the land patterns 81 and 82 and the external terminals E1 and E2 are made by a solder 83. A fillet of the solder 83 is formed on a part of the external terminal E1 (E2) that is formed on the surface S3 (S2) of the coil part 20.

In the present embodiment, the surface of each of the external terminals E1 and E2 is recessed from the surfaces of the magnetic layers 11 and 12, which forms a level difference to make the solder 83 less likely to spread on the surfaces of the magnetic layers 11 and 12. In addition, the interlayer insulating layers 41 to 43 protrude from the surface of each of the external terminals E1 and E2, so that the flow of the solder 83 in the z-direction is suppressed. That is, the protruding part of each of the interlayer insulating layers 41 to 43 extends in the x-direction on the surface S1 of the coil part 20 and extends in the y-direction on the surfaces S2 and S3 of the coil part 20, so that it is possible to suppress the flow of the solder 83 in the z-direction without hindering the flow of the solder 83 in the x- and y-directions. Thus, even when the coil component 10 is mounted in high density on the surface of the circuit board 80, it is possible to prevent a short-circuit failure due to unintended flow of the solder 83.

Such a level difference can be obtained by singulating the coil component 10 by dicing and then etching, with cleaning solution, the surfaces of the electrode patterns 51 to 54 and 61 to 64 exposed to the dicing surface. After that, the external terminals E1 and E2 are formed by barrel plating while preventing them from going beyond the protrusion of the interlayer insulating layers 41 to 43, whereby the coil component 10 according to the present embodiment is completed.

Figure 6:
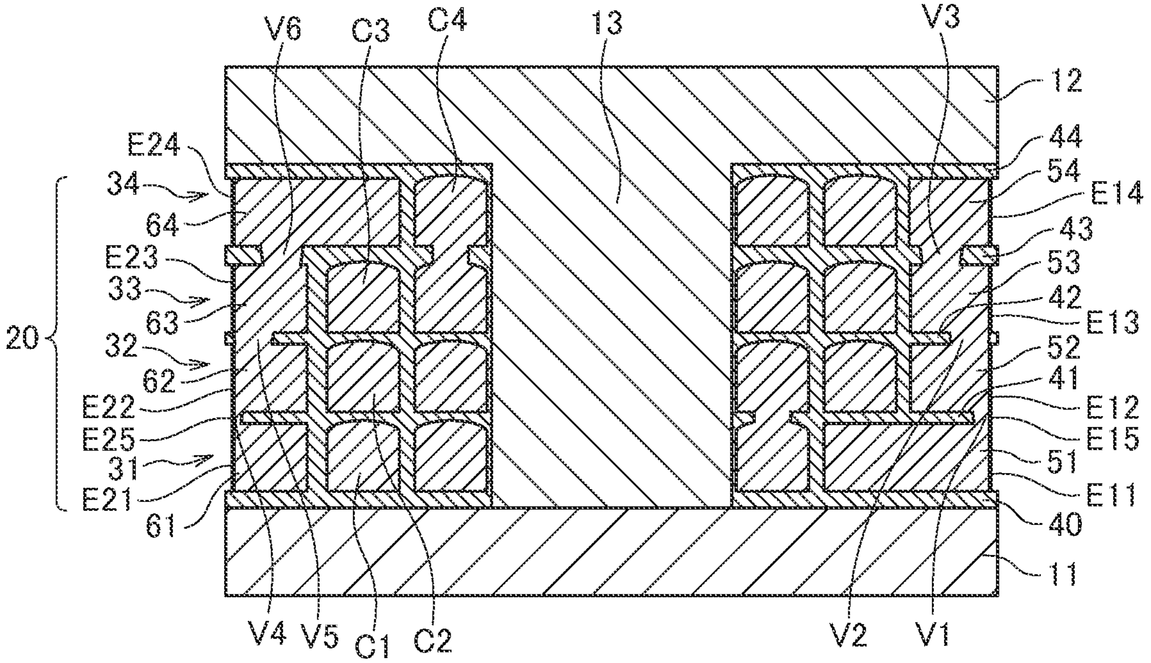
FIG. 6 is a cross-sectional view of the coil component 10.

FIG. 6 is a cross-sectional view of the coil component 10 according to the present embodiment.

As illustrated in FIG. 6, the coil part 20 included in the coil component 10 is sandwiched between the two magnetic layers 11 and 12 and has the interlayer insulating layers 40 to 44 and conductor layers 31 to 34 which are alternately stacked. The conductor layers 31 to 34 are connected to one another through holes formed respectively in the interlayer insulating layers 41 to 43 to constitute a coil. The inner diameter portion of the coil is filled with the magnetic member 13 made of the same material as the magnetic layer 12. The interlayer insulating layers 40 to 44 are made of, e.g., resin, and a nonmagnetic material is used for at least the interlayer insulating layers 41 to 43. A magnetic material may be used for the lowermost interlayer insulating layer 40 and the uppermost interlayer insulating layer 44.

The conductor layer 31 is the first conductor layer formed on the upper surface of the magnetic layer 11 through the interlayer insulating layer 40. The conductor layer 31 has a coil conductor pattern C1 spirally wound in two turns and two electrode patterns 51 and 56. The electrode pattern 51 is connected to one end of the coil conductor pattern C1, while the electrode pattern 61 is provided independently of the coil conductor pattern C1. The coil conductor pattern C1 is embedded in the coil part 20. The electrode pattern 51 is exposed from the coil part 20, and the first part E11 of the external terminal E1 is formed on the surface of the electrode pattern 51. The electrode pattern 61 is exposed from the coil part 20, and the first part E21 of the external terminal E2 is formed on the surface of the electrode pattern 61.

The conductor layer 32 is the second conductor layer formed on the upper surface of the conductor layer 31 through the interlayer insulating layer 41. The conductor layer 32 has a coil conductor pattern C2 spirally wound in two turns and two electrode patterns 52 and 62. Both the electrode patterns 52 and 62 are provided independently of the coil conductor pattern C2. The coil conductor pattern C2 is embedded in the coil part 20. The electrode pattern 52 is exposed from the coil part 20, and the second part E12 of the external terminal E1 is formed on the surface of the electrode pattern 52. The electrode pattern 62 is exposed from the coil part 20, and the second part E22 of the external terminal E2 is formed on the surface of the electrode pattern 62.

The conductor layer 33 is the third conductor layer formed on the upper surface of the conductor layer 32 through the interlayer insulating layer 42. The conductor layer 33 has a coil conductor pattern C3 spirally wound in two turns and two electrode patterns 53 and 63. Both the electrode patterns 53 and 63 are provided independently of the coil conductor pattern C3. The coil conductor pattern C3 is embedded in the coil part 20. The electrode pattern 53 is exposed from the coil part 20, and the third part E13 of the external terminal E1 is formed on the surface of the electrode pattern 53. The electrode pattern 63 is exposed from the coil part 20, and the third part E23 of the external terminal E2 is formed on the surface of the electrode pattern 63.

The conductor layer 34 is the fourth conductor layer formed on the upper surface of the conductor layer 33 through the interlayer insulating layer 43. The conductor layer 34 has a coil conductor pattern C4 spirally wound in two turns and two electrode patterns 54 and 64. The electrode pattern 64 is connected to one end of the coil conductor pattern C4, while the electrode pattern 54 is provided independently of the coil conductor pattern C4. The coil conductor pattern C4 is embedded in the coil part 20. The electrode pattern 54 is exposed from the coil part 20, and the fourth part E14 of the external terminal E1 is formed on the surface of the electrode pattern 54. The electrode pattern 64 is exposed from the coil part 20, and the fourth part E24 of the external terminal E2 is formed on the surface of the electrode pattern 64.

The coil conductor patterns C1 and C2 are connected to each other through a via conductor penetrating the interlayer insulating layer 41, the coil conductor patterns C2 and C3 are connected to each other through a via conductor penetrating the interlayer insulating layer 42, and the coil conductor patterns C3 and C4 are connected to each other through a via conductor penetrating the interlayer insulating layer 43. As a result, a coil of eight turns is formed by the coil conductor patterns C1 to C4, and one end thereof is connected to the first part E11 of the external terminal E1, and the other end thereof is connected to the fourth part E24 of the external terminal E2.

The electrode patterns 51 to 54 are connected to one another through via conductors V1 to V3 penetrating respectively the interlayer insulating layers 41 to 43. Similarly, the electrode patterns 61 to 64 are connected to one another through via conductors V4 to V6 penetrating respectively the interlayer insulating layers 41 to 43. As viewed in the stacking direction, the via conductors V1 to V3 are formed at mutually different positions, and the via conductors V4 to V6 are also formed at mutually different positions.

In the cross section illustrated in FIG. 6, the via conductor V1 is exposed from the coil part 20, whereby the fifth part Ely of the external terminal E1 is formed on the surface of the via conductor V1. On the other hand, in the cross section illustrated in FIG. 6, the via conductors V2 and V3 are not exposed from the coil part 20, whereby the interlayer insulating layers 42 and 43 positioned respectively between the electrode patterns 52 and 53 and between the electrode patterns 53 and 54 partly protrude from the coil part 20. Similarly, in the cross section illustrated in FIG. 6, the via conductor V4 is exposed from the coil part 20, whereby the fifth part E25 of the external terminal E2 is formed on the surface of the via conductor V4. On the other hand, in the cross section illustrated in FIG. 6, the via conductors V5 and V6 are not exposed from the coil part 20, whereby the interlayer insulating layers 42 and 43 positioned respectively between the electrode patterns 62 and 63 and between the electrode patterns 63 and 64 partly protrude from the coil part 20.

As described above, the external terminals E1 and E2 are formed respectively on the surfaces of the electrode patterns 51 to 54 exposed from the coil part 20 and on the surfaces of the electrode patterns 61 to 64 exposed from the coil part 20 so as to avoid the protruding parts of the interlayer insulating layers 41 to 43. It follows that the protruding parts of the interlayer insulating layers 41 to 43 are exposed without being covered with the external terminals E1 and E2. This makes it possible to control the flow of the solder 83 at the time of mounting, as described above.

The surfaces of the conductor layers 32 to 34 may sometimes have a recess at portions where the via conductors V1 to V6 are formed. However, in the present embodiment, as viewed in the stacking direction, the via conductors V1 to V3 are formed at mutually different positions, and the via conductors V4 to V6 are also formed at mutually different positions, so that the recess formed on the surface of each of the conductor layers 32 to 34 is not accumulated. This makes it possible to maintain high flatness.

Further, in the present embodiment, the via conductors V1 and V4 are provided at symmetric positions with respect to the center of the coil part 20, the via conductors V2 and V5 are provided at symmetric positions with respect to the center of the coil part 20, and the via conductors V3 and V6 are provided at symmetric positions with respect to the center of the coil part 20. This facilitates pattern design of the conductor layers 31 to 34 and interlayer insulating layers 41 to 43.

As described above, in the coil component 10 according to the present embodiment, the surface of each of the external terminals E1 and E2 is recessed from the surfaces of the magnetic layers 11 and 12, and the interlayer insulating layers 41 to 43 each protrude from the surfaces of the external terminals E1 and E2, so that it is possible to control the flow of the solder 83 when the coil component 10 is mounted on the circuit board 80. This makes it possible to prevent a short-circuit failure due to unintended flow of the solder 83.

Figure 7:
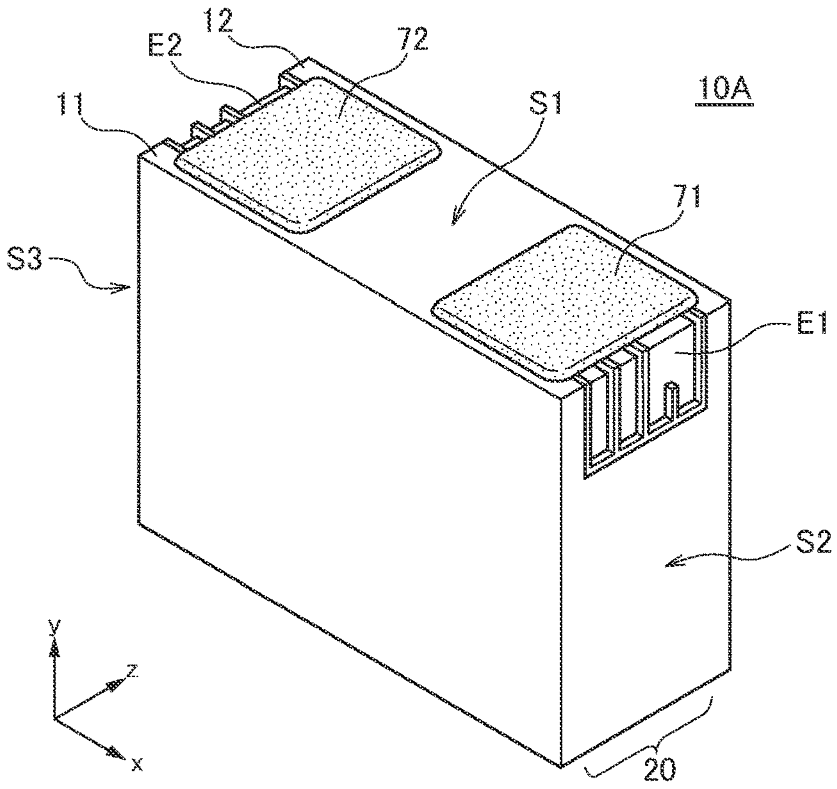
FIG. 7 is a perspective view illustrating the outer appearance of a coil component 10A according to a first modification.
Figure 8:
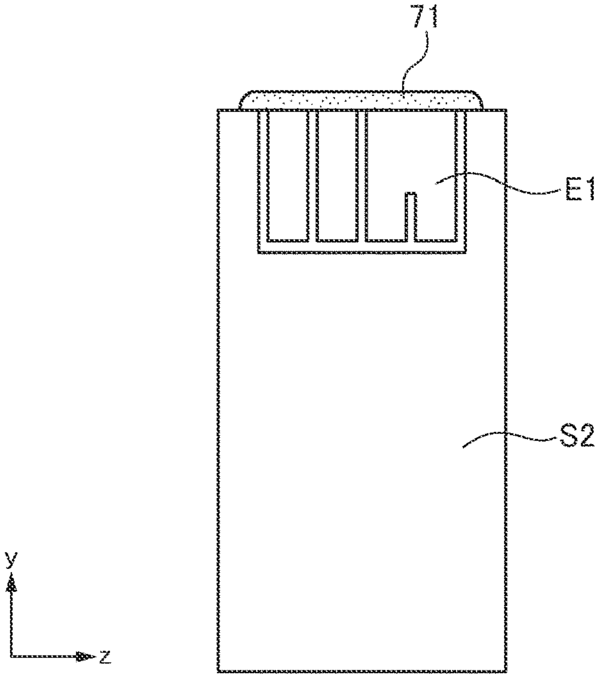
FIG. 8 is a side view of the coil component 10A.

FIG. 7 is a perspective view illustrating the outer appearance of a coil component 10A according to a first modification. FIG. 8 is a side view of the coil component 10A.

The coil component 10A illustrated in FIGS. 7 and 8 differs from the coil component 10 according to the above embodiment in that electrodes 71 and 72 are provided on the surface S1 of the coil component 10A so as to contact the external terminals E1 and E2, respectively. The electrodes 71 and 72 are each made of conductive paste such as nano-silver paste or nano-copper paste, and the surface thereof is covered with a laminated film of nickel (Ni) and tin (Sn) for maintaining wettability with respect to a solder. Adding the thus configured electrodes 71 and 72 can enlarge contact area with a solder. In addition, the interlayer insulating layers 41 to 43 each protrude from the surfaces of the external terminals E1 and E2, so that the electrodes 71 and 72 each bite into the protruding parts of the interlayer insulating layers 41 to 43. That is, the concavo-convex surface due to the protrusion of the interlayer insulating layers 41 to 43 is covered with the electrodes 71 and 72. This enhances fixing strength of the electrodes 71 and 72.

Figure 9:
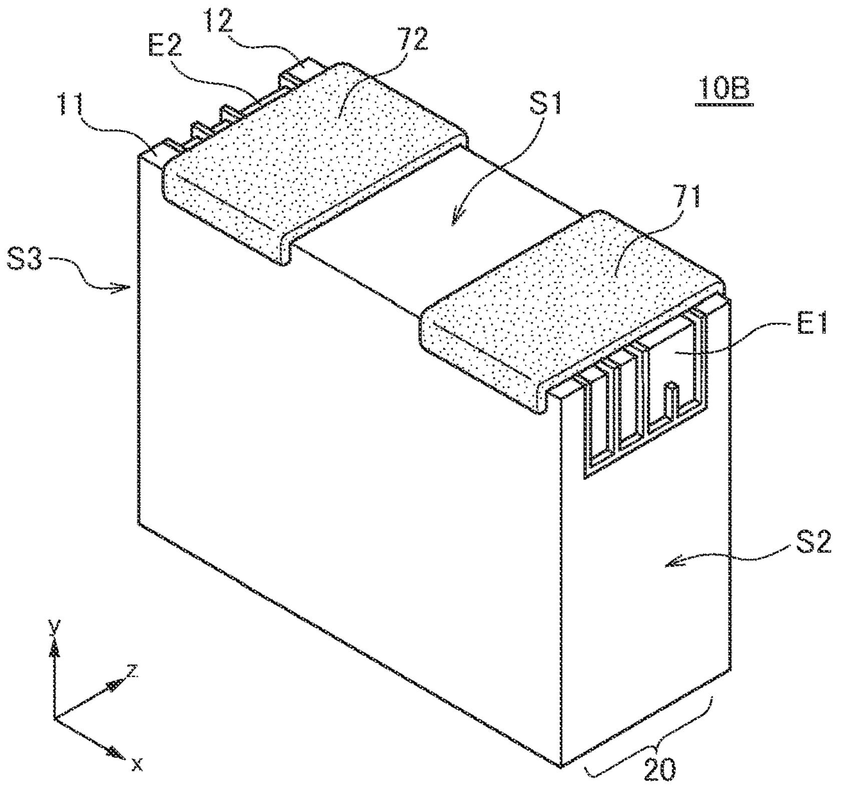
FIG. 9 is a perspective view illustrating the outer appearance of a coil component 10B according to a second modification.
Figure 10:
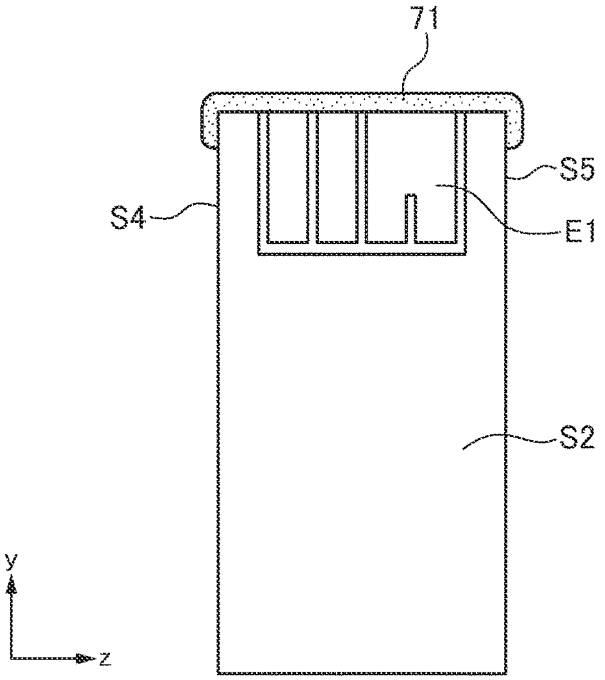
FIG. 10 is a side view of the coil component 10B.

FIG. 9 is a perspective view illustrating the outer appearance of a coil component 10B according to a second modification. FIG. 10 is a side view of the coil component 10B.

The coil component 10B illustrated in FIGS. 9 and 10 differs from the coil component 10A according to the first modification in that the electrodes 71 and 72 each cover not only the surface S1 but also part of the surfaces S4 and S5. The surfaces S4 and S5 are the xy surfaces positioned on the opposite sides. When the surfaces S4 and S5 are thus each partly covered with the electrodes 71 and 72, contact area with a solder is further enlarged, and fixing strength of the electrodes 71 and 72 is further enhanced.

Figure 11:
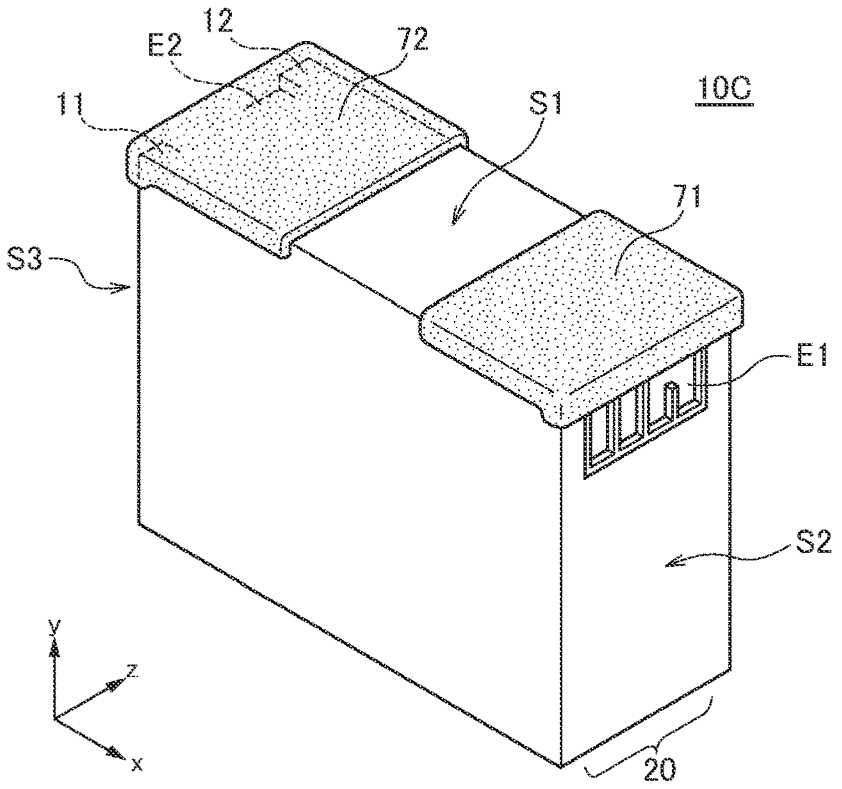
FIG. 11 is a perspective view illustrating the outer appearance of a coil component 10C according to a third modification.
Figure 12:
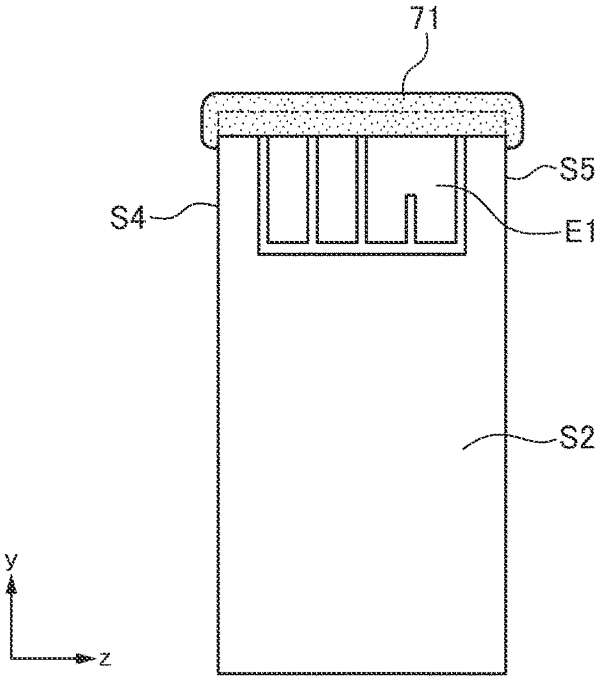
FIG. 12 is a side view of the coil component 10C.

FIG. 11 is a perspective view illustrating the outer appearance of a coil component 10C according to a third modification. FIG. 12 is a side view of the coil component 10C.

The coil component 10C illustrated in FIGS. 11 and 12 differs from the coil component 10B according to the second modification in that the electrode 71 partly covers the external terminal E1 exposed to the surface S2 and the electrode 72 partly covers the external terminal E2 exposed to the surface S3. When a part of the external terminal E1 that is exposed to the surface S2 and a part of the external terminal E2 that is exposed to the surface S3 are covered with the electrodes 71 and 72, respectively, contact area with a solder is still further enlarged, and fixing strength of the electrodes 71 and 72 is still further enhanced. Thus, when the electrodes 71 and 72 are added, the electrodes 71 and 72 each most preferably cover the four surfaces of the coil component 10C as exemplified by the coil component 10C according to the third modification.

While the preferred embodiment of the present disclosure has been described, the present disclosure is not limited to the above embodiment, and various modifications may be made within the scope of the present disclosure, and all such modifications are included in the present disclosure.

For example, although the coil part 20 includes the four conductor layers 31 to 34 in the above embodiment, the number of the conductor layers is not limited to this in the present invention. Further, the number of turns of the coil conductor pattern formed in each conductor layer is not particularly limited to a specific number.

REFERENCE SIGNS LIST

10, 10A-10C coil component
11, 12 magnetic layer
13 magnetic member
20 coil part
31-34 conductor layer
40-44 interlayer insulating layer
51-54, 61-64 electrode pattern
71, 72 electrode
80 circuit board
81, 82 land pattern
83 solder
C1-C4 coil conductor pattern
E1, E2 external terminal
E11, E21 first part
E12, E22 second part
E13, E23 third part
E14, E24 fourth part
E15, E25 fifth part
S1-S3 surface of coil part
V1-V6 via conductor

What is claimed is:

1. A coil component comprising a coil part in which a plurality of conductor layers and a plurality of interlayer insulating layers are alternately stacked, wherein each of the plurality of conductor layers has a coil conductor pattern embedded in the coil part and an electrode pattern exposed from the coil part, wherein a plurality of electrode patterns are connected to one another through a plurality of via conductors penetrating the plurality of interlayer insulating layers, wherein at least one of the plurality of interlayer insulating layers protrudes from surfaces of the plurality of electrode patterns at a part between the plurality of electrode patterns, and wherein the surfaces of the plurality of electrode patterns exposed from the coil part are covered with external terminals and the part of the interlayer insulating layer protrudes from the surfaces of the plurality of electrode patterns covered with the external terminals.

2. The coil component as claimed in claim 1, further comprising first and second magnetic layers sandwiching the coil part in a stacking direction.

3. The coil component as claimed in claim 2, wherein a surface of each of the plurality of electrode patterns is recessed from surfaces of the first and second magnetic layers.

4. The coil component as claimed in claim 1, wherein a surface of each of the plurality of electrode patterns is covered with an external terminal, and wherein a protruding amount of each of the plurality of interlayer insulating layers from a surface of the external terminal is set to 1 μm to 5 μm.

5. The coil component as claimed in claim 1, wherein surfaces of the plurality of electrode patterns and protruding parts of the plurality of interlayer insulating layers are covered with a conductive paste.

* * * * *